UNITED STATES PATENT OFFICE.

WALLACE JAMES LAMBERT SANDY, OF LONDON, ENGLAND.

ELECTROLYTE FOR USE IN ELECTRIC BATTERIES.

940,734.

Specification of Letters Patent.

Patented Nov. 23, 1909.

No Drawing.

Application filed August 22, 1908. Serial No. 449,774.

*To all whom it may concern:*

Be it known that I, WALLACE JAMES LAMBERT SANDY, electrical engineer, a subject of the King of Great Britain, residing at Britannia Works, Canal Bridge, Old Kent Road, London, England, have invented an Improved Electrolyte for Use in Electric Batteries, of which the following is a specification.

This invention relates to an improved electrolyte of the class containing sulfuric acid hydrochloric acid and chromic acid or sodium bichromate for use in electric batteries, the electrodes of which may be of carbon and zinc.

A concentrated solution of sodium or potassium bichromate and concentrated hydrochloric acid generate chlorin at the ordinary temperature, while a dilute solution of the two substances does not evolve chlorin even by warming. Evidently, therefore, there must be a critical concentration of the bichromate and hydrochloric acid, at which the solution, while not of itself evolving the chlorin, is in the best condition for acting as a potential chlorin generator, that is, has the maximum tendency to produce chlorin in the presence of an oxidizable substance, such as hydrogen. We have discovered an electrolyte in which this critical concentration is more nearly attained than in any other electrolyte of similar character, which electrolyte possesses the property of not giving off any considerable amount of gases and so can be used in a closed cell. This electrolyte may be produced from the following substance in about the proportions stated, viz: by adding to 36 fluid ounces of a mixture containing 2 volumes sulfuric acid, 2 volumes hydrochloric acid and 1 volume of water the following: 32 ounces bichromate of sodium dissolved in 128 ounces of water and 6 fluid ounces of a saturated solution of caustic soda.

One method of making the electrolyte is by mixing sulfuric acid, of a strength generally known in commerce as concentrated, say 60° Baumé, the specific gravity being 1.71, with half its volume of water, to this is added in small quantities at a time ordinary commercial concentrated hydrochloric acid, say 21° Baumé, the specific gravity being 1.17. At first bubbles of gas are given off but these stop as soon as the requisite amount of hydrochloric acid has been added; it will then be found that the quantity of hydrochloric acid which has been added is nearly equal in quantity to the sulfuric acid. Thirty-two ounces of sodium bichromate is then dissolved in one hundred and twenty-eight fluid ounces of water, with this solution is thoroughly mixed thirty-six fluid ounces of the sulfuric-hydrochloric acid mixture above described, and to the whole is added six fluid ounces of caustic soda (formed by dissolving 5 oz. of caustic soda in 6 oz. of water) or its equivalent of potash.

I claim as my invention:—

An electrolyte produced by adding to 36 fluid ounces of a mixture containing 2 volumes sulfuric acid, 2 volumes of hydrochloric acid and 1 volume of water the following: 32 ounces of bichromate of sodium dissolved in 128 ounces of water and 6 fluid ounces of a saturated solution of caustic soda.

WALLACE JAMES LAMBERT SANDY.

Witnesses:
 H. D. JAMESON,
 A. NUTTING.